(12) United States Patent
Browning et al.

(10) Patent No.: US 8,893,653 B2
(45) Date of Patent: Nov. 25, 2014

(54) ANIMAL FEEDER

(75) Inventors: Art R. Browning, Scurry, TX (US);
Joseph Michael Wood, Dallas, TX (US)

(73) Assignee: Wireless Wildlife Products, LLC

( * ) Notice: Subject to any disclaimer, the term of this patent is extended or adjusted under 35 U.S.C. 154(b) by 0 days.

(21) Appl. No.: 13/600,404

(22) Filed: Aug. 31, 2012

(65) Prior Publication Data

US 2014/0060439 A1    Mar. 6, 2014

(51) Int. Cl.
    *A01K 1/10*          (2006.01)
    *A01K 39/014*      (2006.01)
    *A01K 5/02*         (2006.01)

(52) U.S. Cl.
    CPC ............. *A01K 5/0291* (2013.01); *A01K 39/014* (2013.01)
    USPC ..................................... 119/51.11; 119/57.91

(58) Field of Classification Search
    CPC ........................... A01K 5/0293; A01K 39/014
    USPC ........ 119/51.01, 51.02, 51.04, 52.1, 52.4, 53, 119/55, 56.1, 57.5, 57.91, 900, 902
    See application file for complete search history.

(56) References Cited

U.S. PATENT DOCUMENTS

| | | | | |
|---|---|---|---|---|
| 1,429,297 | A * | 9/1922 | O'Neill et al. | 119/57.91 |
| 5,143,289 | A * | 9/1992 | Gresham et al. | 239/7 |
| 5,333,572 | A * | 8/1994 | Nutt | 119/57.91 |
| 5,820,035 | A * | 10/1998 | Johnson et al. | 239/684 |
| 5,926,441 | A * | 7/1999 | Zinsmeyer et al. | 368/10 |
| 6,367,417 | B1 * | 4/2002 | Gal et al. | 119/51.5 |
| 7,222,583 | B2 * | 5/2007 | Foster et al. | 119/57.91 |
| 7,275,501 | B1 * | 10/2007 | Laceky | 119/57.92 |
| 7,306,175 | B1 * | 12/2007 | Farmer | 239/666 |
| 7,404,376 | B2 * | 7/2008 | Hernandez | 119/57.91 |
| 7,866,579 | B2 * | 1/2011 | Chism | 239/687 |
| 2005/0284381 | A1* | 12/2005 | Bell et al. | 119/51.02 |
| 2012/0085289 | A1* | 4/2012 | Quiring et al. | 119/57.91 |

\* cited by examiner

*Primary Examiner* — Rob Swiatek
*Assistant Examiner* — Ebony Evans
(74) *Attorney, Agent, or Firm* — Gardere Wynne Sewell LLP

(57) ABSTRACT

An improved automated animal feeder or feeding apparatus comprises a substantially water-resistant housing having at least one closable port. A feed distributor is located in the housing and configured to distribute feed to the exterior of the housing through the port. An opening in an upper end of the housing is configured to admit feed to the housing and to the feed distributor through gravity. A drive arrangement is disposed in the housing and coupled to the feed distributor and to the closeable port to selectively actuate the feed distributor and selectively open and close the closeable port.

15 Claims, 6 Drawing Sheets

ANIMAL FEEDER

BACKGROUND OF THE INVENTION

1. Field of the Invention

The present invention relates generally to animal or game feeders. More particularly, the present invention relates to improvements in automated and remotely controlled animal or game feeders.

2. Summary of the Prior Art

Animal feeders for both domestic and wild animals have existed for decades if not centuries. Their use in wildlife and game management is a more recent trend. As attention to conservation of natural resources grows, animal or game feeders are an increasingly important element in wildlife management.

Used properly, such feeders can maintain an animal population and keep game adequately fed and therefore content to remain on property for harvesting at an appropriate time. Because they are often placed in remote locations, minimal maintenance and upkeep is at a premium and the ability or capacity for remote control is ideal.

U.S. Patent Publication 2011/0088625 to Nowacek describes a game or animal feeder that is wirelessly controlled. One purported advantage of the feeder design is that animal feed is placed in the feeder from ground level and an auger arrangement is employed to raise it to feeding level. Gravity feed has been found to be more consistently reliable than designs that rely on augers and similar devices to move feed against gravity.

Nowacek also discloses wireless remote control of various feeder functions. However, it discloses only use of conventional wireless and cellular communication technologies, which requires the feeder to be within communication range of a cellular base station and antenna or a wireless network access point. It is frequently not practical to place a wildlife or game feeder in such a location.

A need exists for practical, reliable game and animal feeders that can be remotely controlled in a wide variety of locations without regard to proximity to communications infrastructure.

SUMMARY OF THE INVENTION

It is a general object of the present invention to provide an improved animal feeder or feeding apparatus. This and other objects of the present invention are achieved with an improved automated animal feeder or feeding apparatus comprising a substantially water-resistant housing having at least one closable port. A feed distributor is located in the housing and configured to distribute feed to the exterior of the housing through the port. An opening in an upper end of the housing is configured to admit feed to the housing and to the feed distributor through gravity. A drive arrangement is disposed in the housing and coupled to the feed distributor and to the closeable port to selectively actuate the feed distributor and selectively open and close the closeable port.

According to a preferred embodiment of the present invention, the feed distributor is a rotary slinger.

According to a preferred embodiment of the present invention, a feed hopper is mounted above the housing and in communication with the opening in the housing for gravity feed of feed to the feed distributor.

According to a preferred embodiment of the present invention, the drive arrangement comprises at least one electric motor coupled to the feed distributor.

According to a preferred embodiment of the present invention, a controller is in communication with the drive arrangement to permit remote actuation of the feed distributor and remote opening and closing of the port.

According to a preferred embodiment of the present invention, the controller includes a wireless communication link.

According to a preferred embodiment of the present invention, there is a platform within the housing, wherein the feed distributor is mounted on the platform, and the platform is movable up and down within the housing responsive to the drive arrangement. There is a door for closing the port in the housing, the door coupled to the platform, wherein movement of the platform within the housing selectively opens and closes the port.

According to a preferred embodiment of the present invention, a wireless controller is in the housing and coupled to the drive arrangement, the wireless controller allowing remote control of at least two of the following:

feeding times;
quantity of feed distributed;
unclog the feed distributor;
check the level of feed in the feed hopper;
check a level of battery power;
test feeder function;
monitor weather conditions at the feeding apparatus; and
view an event log.

Other objects, features, and advantages of the present invention will become apparent with reference to the Figures and to the detailed description, which follows.

DETAILED DESCRIPTION

Figure 1:
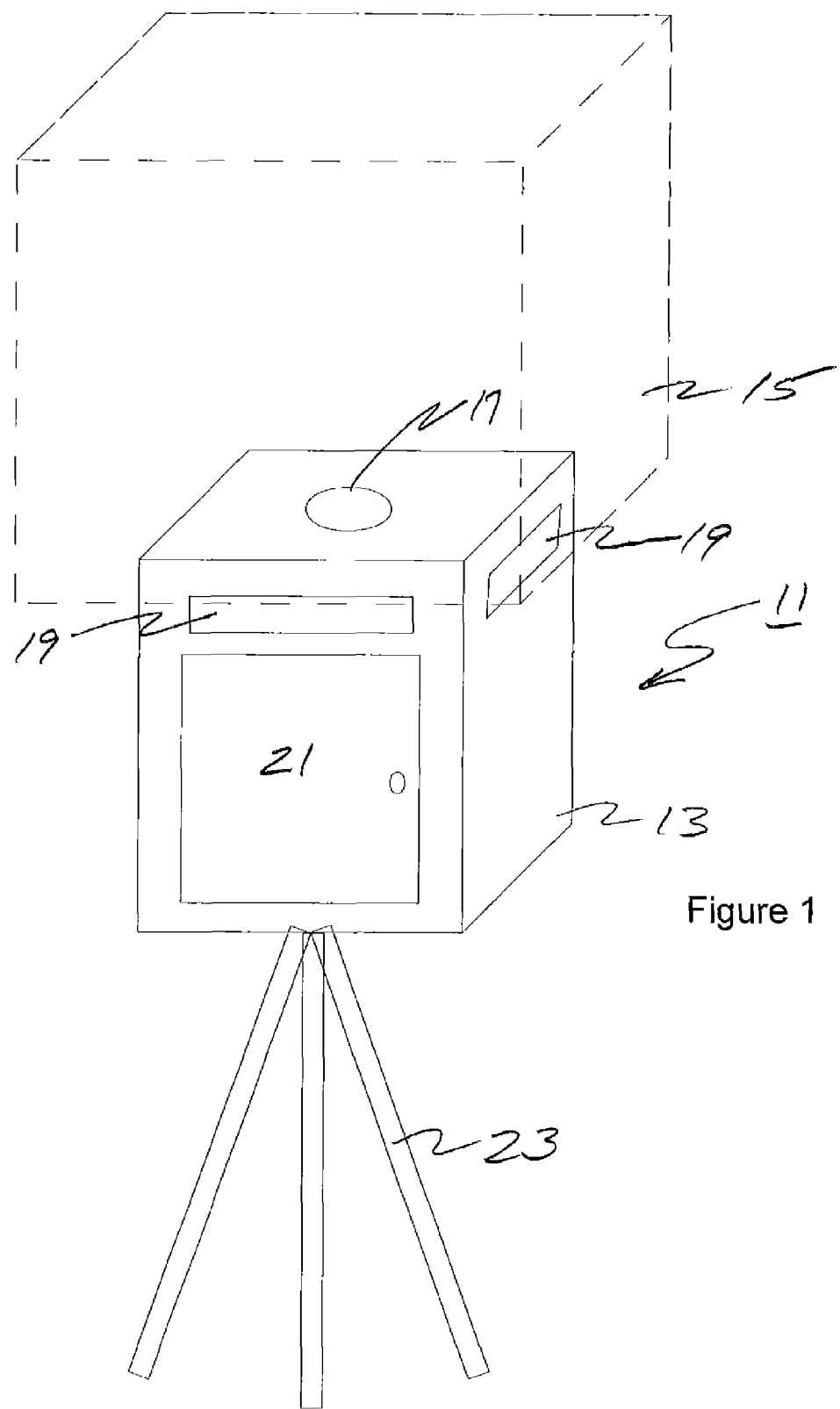
FIG. 1 is a perspective schematic view of the feeder apparatus according to the present invention.

Referring now to the Figures, and particularly to FIG. 1, an animal feeder or feeding apparatus 11 according to an embodiment of the present invention is illustrated. A housing 13 has a feed hopper 15 of conventional construction mounted atop it for gravity feed of an animal feed through a hole or aperture 17 in the top of housing 13.

Feed is distributed from the apparatus 11 through ports 19, which preferably are rectangular and formed in the sidewall of housing 13. A port 19 may be provided in each wall of housing 13 (two are obscured from view in FIG. 1). Housing 13 also includes an access door 21 to permit access to the components therein, which are described in greater detail below. The entire feeder apparatus 11 may be mounted on a tripod 23, tree stand, or other conventional apparatus to place feeder in a desired location.

Figure 2:
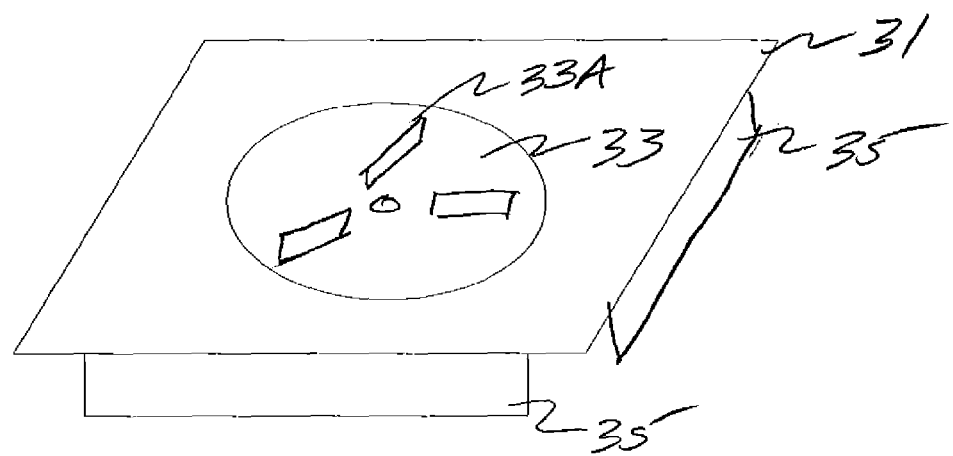
FIG. 2 is a perspective view of the platform of the feeding apparatus according to the present invention.

FIG. 2 illustrates a platform 31 that is housed within housing 13 and mounts or supports a feed distributor 33. According to a preferred embodiment of the invention, feed distributor 33 is a round "slinger" having a plurality of blades 33A mounted thereon. Feed distributor 33 is rotated at a selected speed and animal feed from feed hopper (15 in FIG. 1) is "slung" outward through the ports (19 in FIG. 1) by centrifugal force at a selected rate. Platform 31 preferably may be formed of sheet steel and has a plurality of doors 35 (four to match the four ports 19), two of which are obscured from view in FIG. 2. As will be described in connection with FIG. 3, doors 35 close or obstruct ports 19 in housing 13, thereby cutting off the flow of animal feed from feeder 11 and at least partially enclosing housing 13 from the elements.

Figure 3:
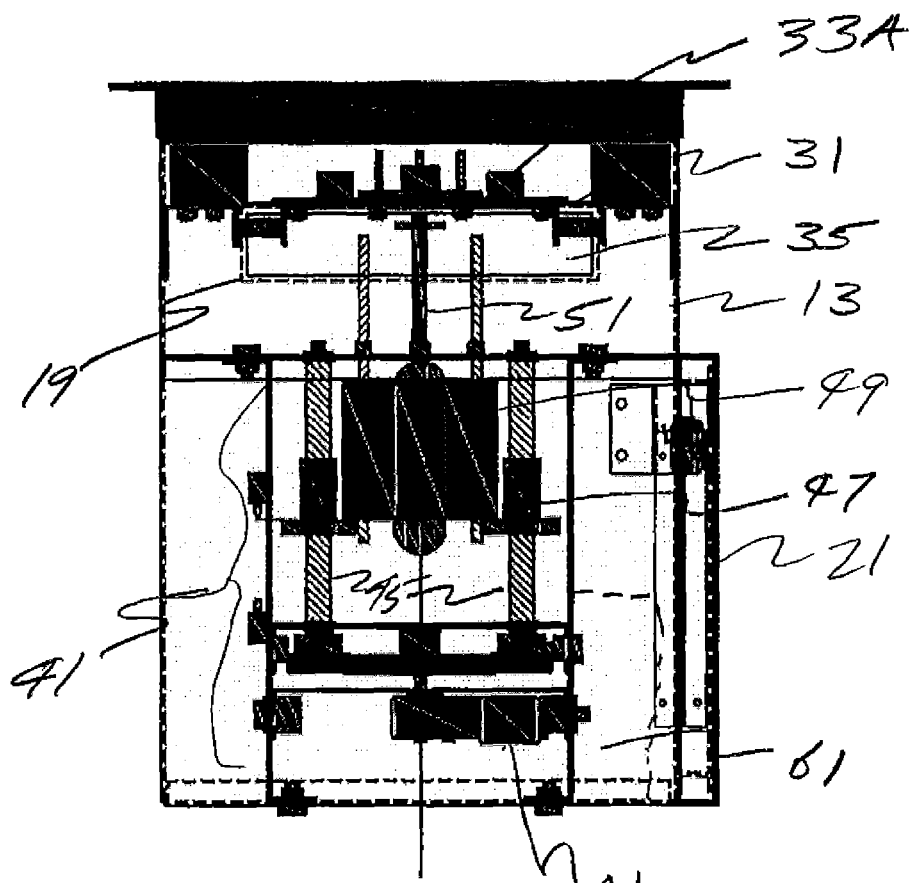
FIG. 3 is an elevation view, partially in section, of the housing and drive arrangement of the feeder apparatus of the present invention.

FIG. 3 is a section view of housing 13 showing the motion or mechanical components within housing 13. Platform 31 and feed distributor 33 are coupled or connected to a drive arrangement or mechanism 41. Drive 41 serves to provide power to rotate feed distributor 33 and to move platform 31 up and down within housing, which permits closure of ports 19 by doors 35 carried by platform 33. Accordingly, drive 41 may have a gear motor 43, which is coupled to a planetary gear train 45. Gear train 45 rotates a pair of lead screws 47, which are coupled by linear bearings to a motor 49. Motor 49 is coupled by a shaft 51 to feed distributor 33 to provide rotary motion and power. Platform 31 is coupled to the motor and its mountings to permit up and down movement within housing 13, which permits opening and closing of ports 19 as described. Movement of platform 31 also changes the volume in housing 13 that animal feed can occupy, providing a measure of control over the amount of feed distributed by distributor 33.

Also included within housing 13 is a wireless controller 61. Controller 61 is coupled to drive 41 to selectively and remotely operate the motors 43, 49 to control movement of platform 31 within housing 13 and operation of feed distributor 33. Other features of wireless controller 61 are described below. Door 21 on housing 13 permits access to the mechanical components described above as well as to wireless controller 61.

Figure 4:
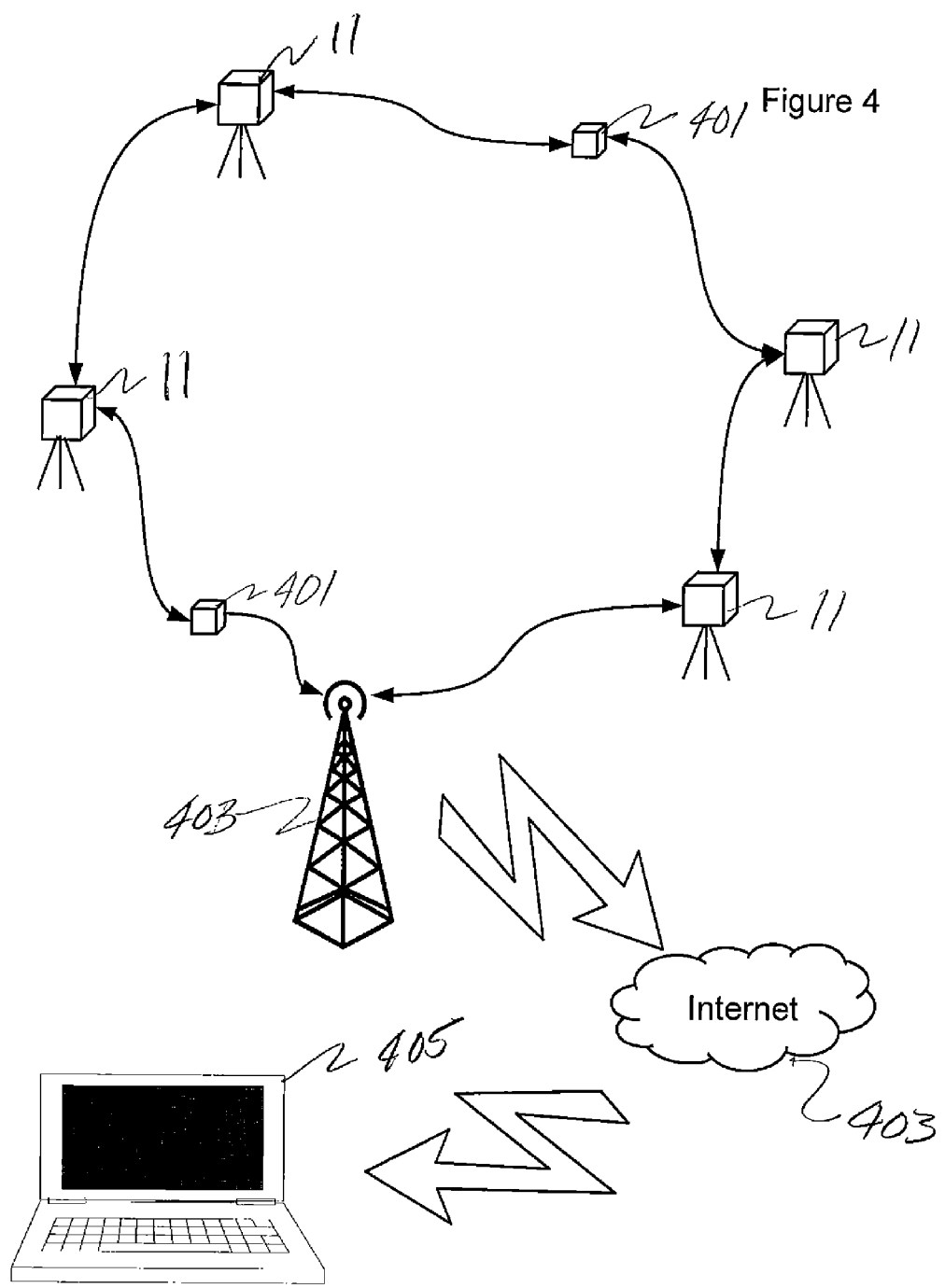
FIG. 4 is a schematic depiction of the node-to-node wireless communication network connecting feeder apparatuses according to the present invention.

Wireless controller 61 employs a "node-to-node" wireless communication system, schematically depicted in FIG. 4, that employs communication technology such as XBee® DigiMesh 900 Mesh RF Modules (XBee® is a trademark of Digi International, Inc., 11001 Bren Road East Minnetonka, Minn. 55343) or the public domain ZigBee peer-to-peer networking technologies. The node-to-node or peer-to-peer nature of the communication protocol eliminates the need to communicate directly with a cellular base station or with a wireless network access point 401, either or both of which may be out of range in the locations where feeders 11 are conventionally located. Rather, feeder 11 need only be in range of another similarly equipped feeder 11 or other node apparatus, such as a game camera or repeater or relay 401. The first feeder 11 can communicate all of its data to the second feeder 11 or node 401 (and third and fourth, etc.) requiring only one feeder 11 to be within range of a cellular base station or wireless access point or gateway 403, which is in turn in communication with network 405, which may be the internet or a dedicated communication network. Communication can be established over the network 405 between a remote user station, such as an internet-connected PC or "smartphone" 407, 409 and any number of feeders 11 or other nodes 401, with only one feeder 11 or node 401 being required to be within range of wireless communication services.

Figures 5, 6:
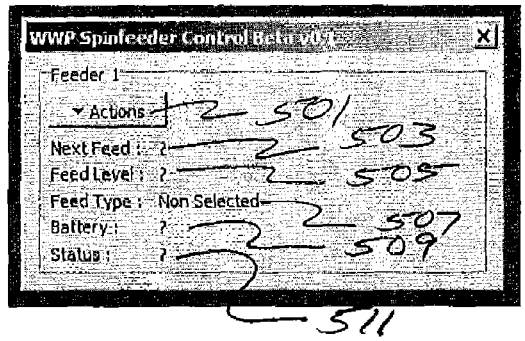
FIG. 5 is a screen shot of a screen of the user interface of the feeder apparatus according to the present invention.
FIG. 6 is a screen shot of a screen of the user interface of the feeder apparatus according to the present invention.
Figure 7:
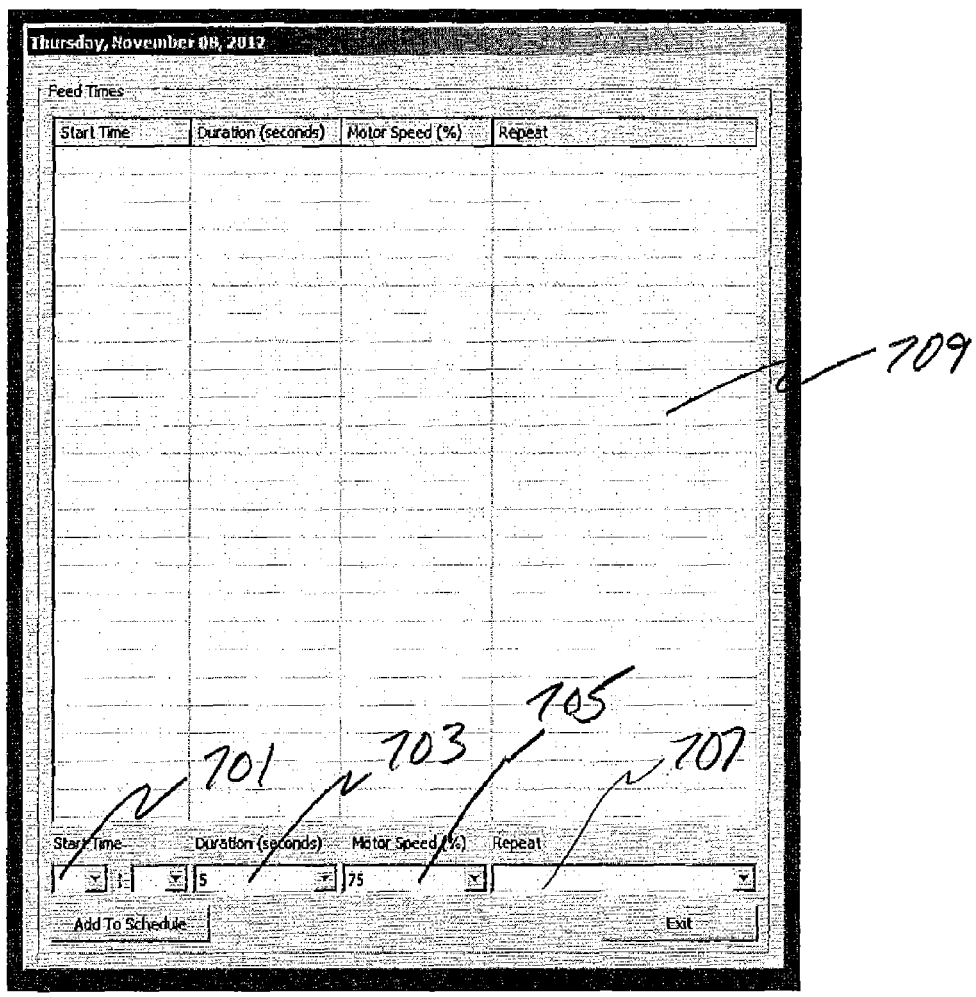
FIG. 7 is a screen shot of a screen of the user interface of the feeder apparatus according to the present invention.

FIGS. 5 through 10 depict screen shots of control software, in this case running on a personal computer (PC), showing functions of the feeder 11 that may be controlled remotely or wirelessly. FIG. 5 shows the starting screen, which indicates the number of the feeder under control (1 in this case, being a single feeder). The "action" button 501 provides access to a menu, which includes the following options:

ADD TO FEED SCHEDULE
CHOOSE FEED TYPE
ADJUST FEED LEVEL
SET FEEDER DATE AND TIME
CHECK FEEDER STATUS
SEND SCHEDULE TO FEEDER
VIEW FEED LOG
TEST FEED

The screen also supplies basic information about the feeder under control, including the next scheduled feed time and date 503, the level of animal feed remaining in the feeder 505, the type of feed in the feeder 507, the battery level 509, and feeder status 511.

If the ADD TO FEED SCHEDULE option is selected, the screen of FIG. 6 appears, which allows the user to select dates for feeding from the calendar 601, or allows deletion of all currently programmed dates 603. When a day on the calendar is selected, the screen of FIG. 7 appears, which allows entry of start time 701, duration of motor and distributor running (an analog for the amount of feed distributed) 703, the motor speed as a percentage of maximum 705, and to repeat the cycle at different times 707. The existing feed schedule data is displayed in the table 709.

Figure 8:
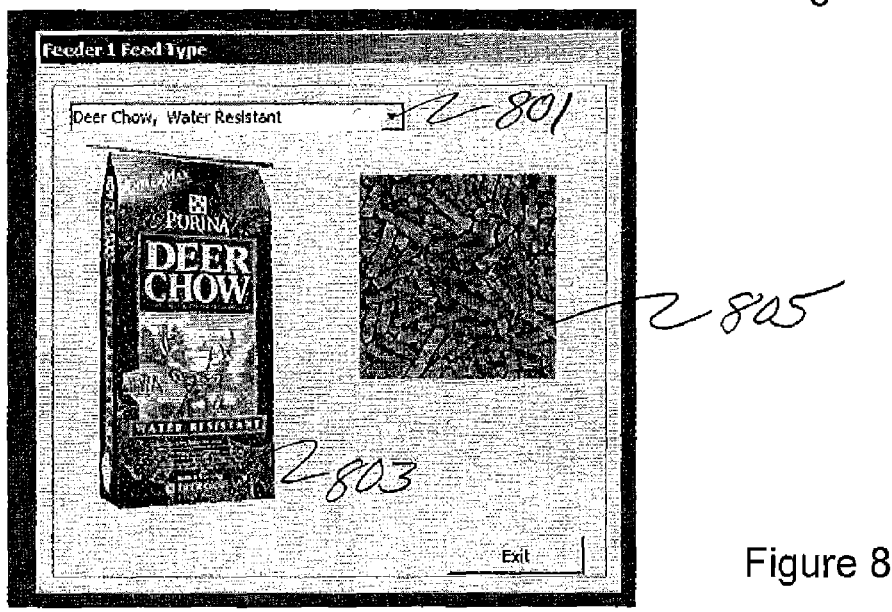
FIG. 8 is a screen shot of a screen of the user interface of the feeder apparatus according to the present invention.

If the CHOOSE FEED TYPE option is selected, the screen of FIG. 8 appears, which permits selection of a plurality of pre-programmed feeds from a drop-down menu 801 and displays photos of the packaging 803, and the feed itself 805. Although not shown, the software maintains data concerning specific feeds and its rate of passage or flow from the feed hopper 15 into housing 13 for distribution by feed distributor 33, as well as the rate at which the feed is actually distributed so that remaining feed level can be calculated.

Figure 9:
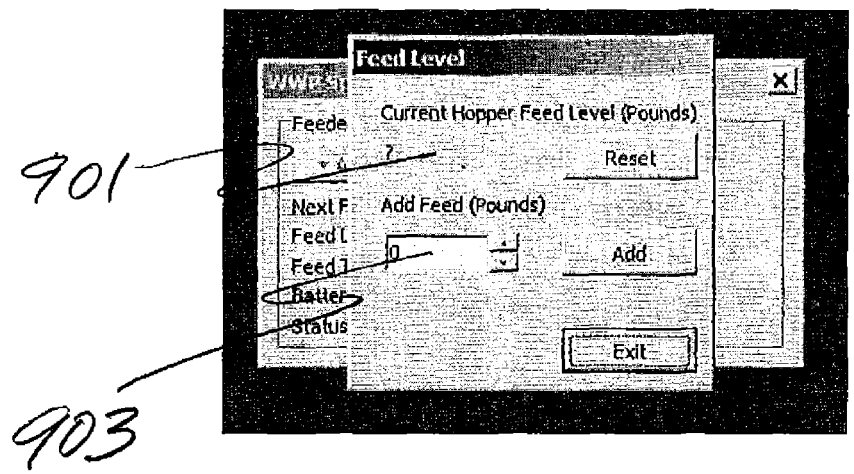
FIG. 9 is a screen shot of a screen of the user interface of the feeder apparatus according to the present invention.

If the ADJUST FEED LEVEL OPTION is selected, the screen of FIG. 9 appears, which displays the amount of feed remaining in the feeder 901, and permits the addition 903 (in pounds) of more feed to that quantity.

If the SET FEEDER DATE AND TIME OPTION is selected, a link is established with the feeder to permit setting the internal clock date and time (of wireless controller 61), and the existing setting is displayed.

If the CHECK FEEDER STATUS option is selected, communication is established with a feeder 11 and its status is communicated with the user. Status includes whether feeder systems are operational or an error condition exists and the battery level. The status is displayed on the screen of FIG. 5.

If the SEND SCHEDULE TO FEEDER option is selected, the schedule established in the screen of FIG. 6 is sent to feeder 11 for implementation.

If the VIEW FEED LOG option is selected, a log showing past feed times, amounts and durations is displayed.

Figure 10:
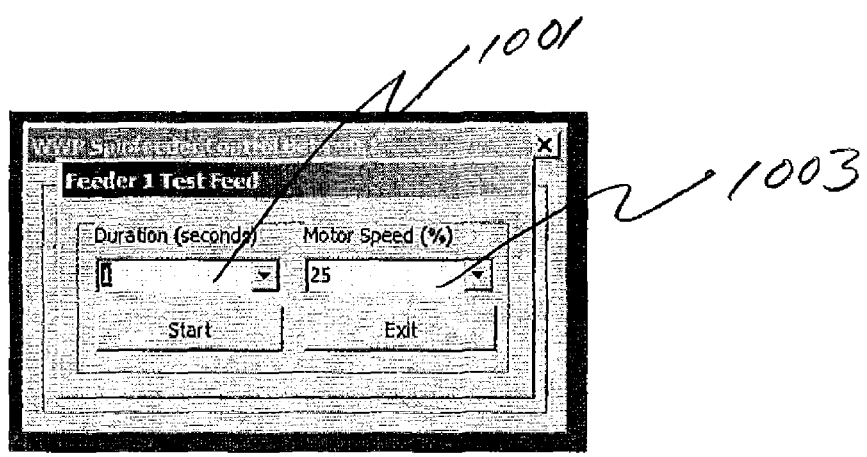
FIG. 10 is a screen shot of a screen of the user interface of the feeder apparatus according to the present invention.

If the TEST FEED option is selected, the screen of FIG. 10 is displayed and a duration 1001 and motor speed 1003 may be selected to test feeder operation.

We claim:

1. An improved automated animal feeding apparatus comprising:
   a housing having at least one closable port;
   a feed distributor in the housing and configured to distribute feed to an exterior of the housing through the at least one closeable port;
   an opening in an upper end of the housing configured to admit feed to the housing and to the feed distributor through gravity;
   a platform in the housing having a door attached thereto; and
   a drive arrangement disposed in the housing and coupled to the feed distributor to both selectively actuate the feed distributor and to selectively open and close the at least one closeable port by moving the platform and the door up and down within the housing.

2. The animal feeding apparatus of claim 1, wherein the feed distributor is a rotary slinger and the door moves up to close the at least one closeable port.

3. The animal feeding apparatus of claim 1, further comprising a feed hopper mounted above the housing and in communication with the opening in the housing for gravity feed of feed to the feed distributor.

4. The animal feeding apparatus of claim 1, wherein the drive arrangement comprises:
   at least one electric motor coupled to the feed distributor.

5. The animal feeding apparatus of claim 1 further comprising a controller in communication with the drive arrangement to permit remote actuation of the feed distributor and remote opening and closing of the at least one closeable port.

6. The animal feeding apparatus of claim 5, wherein the controller includes a wireless communication device.

7. The animal feeding apparatus of claim 1,
   wherein the feed distributor is mounted on the platform; and
   wherein the door is coupled to the platform, wherein movement of the platform within the housing selectively opens and closes the at least one closeable port.

8. The feeding apparatus of claim 1, further comprising:
   a wireless controller in the housing and coupled to the drive arrangement, the wireless controller allowing remote control of at least two of the following:
   feeding times;
   quantity of feed distributed;
   unclogging the feed distributor;
   check a level of feed in a feed hopper;
   check a level of battery power;
   test feeder function;
   monitor weather conditions at the feeding apparatus; and
   view an event log.

9. An animal feeding apparatus comprising:
   a housing with an opening in communication with a feed hopper for gravity-assisted delivery of feed from the hopper to the housing;
   at least one port in the housing, the at least one port being selectively closeable;
   a rotary feed distributor configured to distribute feed through the at least one port to an exterior of the housing;
   a platform in the housing having a door attached thereto; and
   a drive mechanism to both rotate the feed distributor and to open and close the at least one port by moving the platform and the door up and down in the housing.

10. The feeding apparatus of claim 9 wherein
    the rotary feed distributor is mounted on the platform and
    wherein movement of the platform up in the housing obstructs the closeable port with the door.

11. The feeding apparatus of claim 10, wherein the drive mechanism further comprises:
    a powered leadscrew coupled to the platform to cause the platform to move up and down within the housing.

12. The feeding apparatus of claim 9, further comprising:
    a wireless controller in the housing and coupled to the drive arrangement, the wireless controller allowing remote control of at least two of the following:
    feeding times;
    quantity of feed distributed;
    unclogging the feed distributor;
    check a level of feed in the feed hopper;
    check a level of battery power;
    test feeder function;
    monitor weather conditions at the feeding apparatus; and
    view an event log.

13. A feeding apparatus comprising:
    a housing with an opening in communication with a feed hopper for gravity-assisted delivery of feed from the feed hopper to the housing;
    at least one port in the housing, the at least one port being selectively closeable;
    a feed distributor configured to distribute feed through the at least one port to an exterior of the housing;
    a platform in the housing having a door attached thereto;
    a drive mechanism to both actuate the feed distributor and to open and close the at least one port by moving the platform and the door up and down within the housing; and
    a wireless controller in the housing and coupled to the drive mechanism, the wireless controller allowing remote control of at least two of the following:
    feeding times;
    quantity of feed distributed;
    unclogging the feed distributor;
    check a level of feed in the feed hopper;
    check a level of battery power;
    test feeder function;
    monitor weather conditions at the feeding apparatus; and
    view an event log.

14. The feeding apparatus of claim 13
    wherein the feed distributor is mounted on the platform and
    wherein movement of the platform up in the housing obstructs the closeable port with the door.

15. The feeding apparatus of claim 13, wherein the drive mechanism further comprises:
    a powered leadscrew coupled to the platform to cause the platform to move up and down within the housing.

* * * * *